Nov. 23, 1965 R. P. BURR 3,219,861

ALTERNATING-CURRENT GENERATOR

Filed March 6, 1961 3 Sheets-Sheet 1

INVENTOR
ROBERT P. BURR
BY Charles A. Blank
ATTORNEY

INVENTOR
ROBERT P. BURR
BY Charles A. Blank
ATTORNEY

Nov. 23, 1965 R. P. BURR 3,219,861

ALTERNATING-CURRENT GENERATOR

Filed March 6, 1961 3 Sheets-Sheet 3

INVENTOR
ROBERT P. BURR
BY Charles A. Blank
ATTORNEY

United States Patent Office 3,219,861
Patented Nov. 23, 1965

3,219,861
ALTERNATING-CURRENT GENERATOR

Robert P. Burr, Lloyd Harbor, Huntington, N.Y., assignor to Printed Motors, Inc., New York, N.Y., a corporation of Delaware Filed Mar. 6, 1961, Ser. No. 93,426
4 Claims. (Cl. 310—268)

This invention relates to alternating-current generators and, more particularly, to alternating-current generators utilizing printed-circuit conductors and capable of developing currents having a frequency of for example, twelve cycles per revolution of the generator. Such a generator is particularly useful as a speed-measuring device in which variations of speed are translated into frequency variations of the output signal. A device developing a high frequency of electrical cycles per revolution is capable of detecting transient speed variations. Printed-circuit conductors may be manufactured by any well known printing, plating, or etching process.

It is an object of the present invention to provide a new and improved alternating-current generator of simple construction capable of developing output signals having a high frequency of cycles per revolution of the generator.

In accordance with the invention, an alternating-current generator comprises means having a given periphery for developing substantially discrete concentrated magnetic field regions of smaller peripheral dimension than corresponding peripheral regions of said field-developing means and with adjacent field regions being of opposite polarity. The generator includes continuous winding means comprising individual conductors disposed in the magnetic field regions and having output connections to predetermined conductors and having a number of loop regions which is an integral multiple of the number of magnetic field regions. One of the field-developing means and the winding means is rotatable with respect to the other for developing an alternating-current output signal.

For a better understanding of the present invention, together with other and further objects thereof, reference is made to the following description taken in connection with the accompanying drawings, and its scope will be pointed out in the appended claims.

Referring to the drawings.

Figure 1:
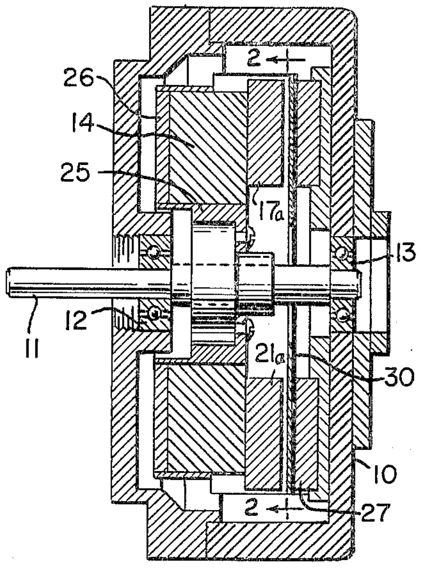
FIG. 1 is a sectional view along a central plane of an alternating-current generator constructed in accordance with the present invention.
Figure 2:
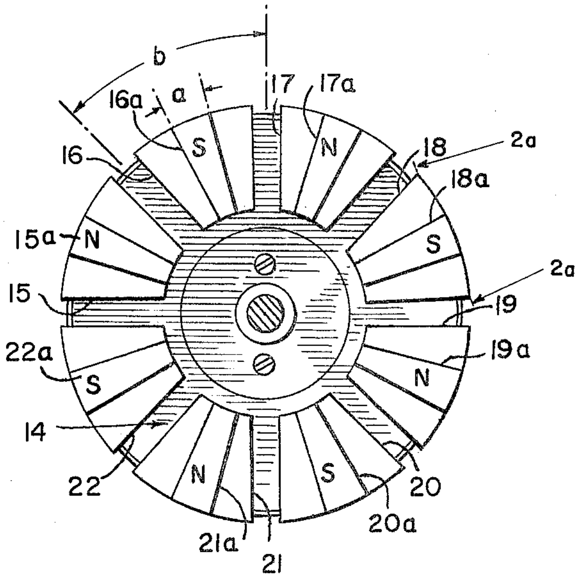
FIG. 2 is a sectional view, taken along line 2—2 of FIG. 1, to represent the magnetic poles of the generator.
Figure 2A:
Figure 3:
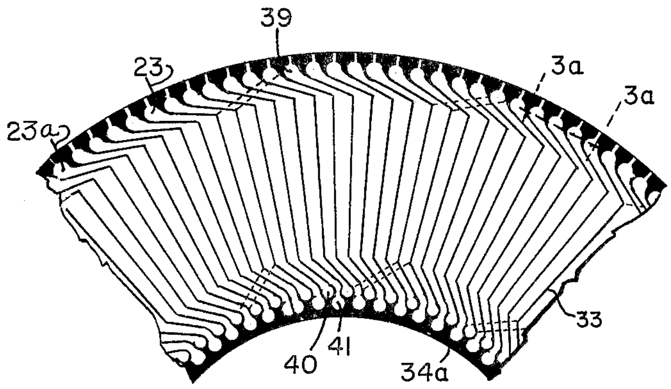
Figure 3A:
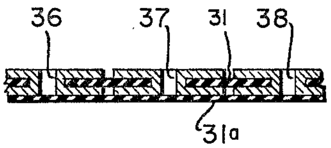
Figure 4:
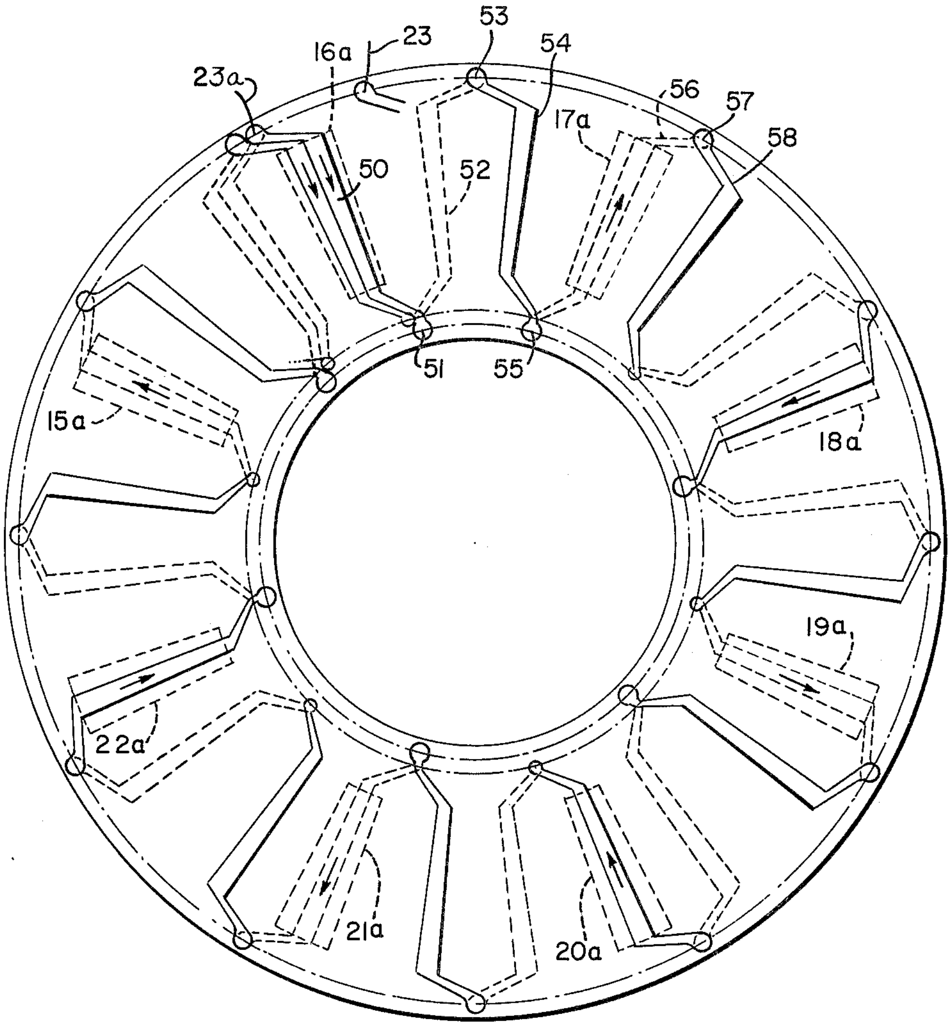

FIG. 2*a* is an end view, taken along line 2*a*—2*a* of FIG. 2, to represent a pole piece of the generator;

FIG. 3 is an enlarged fragmentary plan view of the winding utilized in the FIG. 1 generator;

FIG. 3*a* is an enlarged sectional view, taken along line 3*a*—3*a* of FIG. 3; and FIG. 4 is an enlarged fragmentary plan view of the FIG. 3 winding to represent conductive patterns on both sides of the winding.

Referring now particularly to FIG. 1 of the drawings, the alternating-current generator there represented comprises a generator housing 10 supporting a central shaft 11 journaled in suitable bearings 12, 13. The generator includes means having a given periphery for developing substantially discrete concentrated magnetic field regions of smaller peripheral dimension than corresponding periphal regions of the field-developing means. As represented in section in FIG. 1 and in plan in FIG. 2, the field-developing means comprises an annulus 14 of magnetic material having, for example eight poles or magnetized regions 15–22, inclusive, along its periphery. The annulus may be of suitable ferrite material, such as Indox V, manufactured by Indiana Steel Products. Tapered pole pieces **15*a* to 22*a*,** inclusive, are attached to the poles of the annulus to develop substantially discrete concentrated magnetic field regions with adjacent regions being of opposite polarity, as represented by the North-South symbols N-S. The magnetic field regions which extend over the surface of the pole pieces are of smaller peripheral dimension *a* than the corresponding peripheral regions *b* of the annulus which are substantially equal segments of the annulus corresponding in number to the number of pole pieces. The dimension *a* may, for example, have an angular extent of 15° while the dimension *b* may, for example, have an angular extent of 45°. Accordingly, while substantially the entire body of the annulus is effective to develop magnetic flux, the magnetic field is concentrated into relatively small regions to provide maximum field intensity in those regions and thereby effect optimum signal-generation efficiency.

Referring again to FIG. 1, the annulus 14 is mounted on a suitable hub 25 of an aluminum retaining cup 26 utilized to house the annulus and pole pieces and attached to the shaft 1 for rotation therewith. A ferromagnetic annulus 27 is attached to the housing 10 to complete the path for magnetic flux.

The generator also includes continuous winding means 30 which may be cemented to and insulated from the annulus 27 of FIG. 1 by a suitable insulating sheet **31*a*. The winding means 30 comprises individual printed-circuit conductors disposed in the magnetic field regions and output connections to predetermined conductors. The winding means 30 preferably includes an insulating sheet 31** and individual substantially planar conductors coated on both sides of the insulating sheet, as represented in FIGS. 3 and 3*a*. There may be, for example, 133 conductors on each side of the insulating sheet. The insulating sheet preferably is a suitable material such as Mylar, which is a commercially available polyester film made by E. I. du Pont de Nemours & Company, having a thickness of, for example, .005″. The Mylar sheet is also represented by the lines representing conductor boundaries in FIG. 3. The conductive pattern represented in FIG. 3 is repeated on the other side of the sheet 31, partially represented in FIG. 4, which is a fragmentary view of the winding and its conductive patterns. Thus, the winding pattern on each side of the sheet 31 appears as represented in FIG. 3 when each pattern is viewed from the side of the sheet 31 on which that pattern appears. The radial portions 33 of the conductors on both sides of the winding may coincide.

The insulating sheet 31 has a centrally located aperture **34*a*. Interconnections between the conductive patterns comprise conductive coatings, for example 36, 37, and 38** of FIG. 3*a*, bounding apertures through the insulating material and disposed in a plurality of substantially circular rows 39, 40 and 41 near the boundaries of the winding. The interconnections in the outermost circle 39 are connected to all conductors of the conductive patterns. The interconnections in the innermost circle 41 are connected to alternate conductors in each conductive pattern on each surface of the winding. The interconnections in the other inner circle 40 are connected to conductors between the aforesaid alternate conductors in the conductive patterns. Thus, it will be seen in FIG. 3 that alternate connections to the conductors are staggered, that is, connections to alternate conductors are in the innermost circle 41 and connections to the conductors between the aforesaid alternate conductors are in the adjacent circle 40, preferably midway between the apertures of circle 41. This construction of the winding provides substantial regions of the conductors in which coated apertures are located. One exception to the staggering of connections occurs, as represented in the drawing, because an odd number of conductors is utilized on each surface of the winding.

The winding 30 may be manufactured by any suitable photo-printing process, for example, as described in copending application Serial No. 792,733, filed February 12, 1959 by Swiggett now Patent 2,970,238. To provide maximum output signal, the armature winding comprises a number of loop regions which is an integral multiple of the number of magnetic poles of the generator. As represented in FIG. 4, the winding comprises, for example, 24 loop regions with each region corresponding to a half-turn of the winding. For example, one loop region extends from conductor 50 to conductor 52 and has an angular extent of approximately 15°. The effective angular extent of the pole piece is not substantially greater than the angular extent of the loop region so that substantially all the magnetic field from a given pole piece is concentrated within one loop region and intersects substantially only 5 or 6 conductors included in the loop region. Also, to obtain maximum output signal, the number of loop regions is selected to provide additive signals in the winding. The number of loop regions is determined in accordance with the following equation by selecting an integral number for the symbol $k$:

$$N=2n+4kn \quad (1)$$

where $N$ represents the total number of loop regions
$n$ represents the number of magnet pole pairs
$k$ represents the number of pairs of loop regions per magnet pole in excess of one loop region per magnet pole Accordingly, in an eight-pole structure when, for example, $k$ is selected as 1, then $N=24$; when $k$ is selected as 2, then $N=40$; when $k$ is selected as 3, then $N=56$.

Considering now the operation of the generator, when the shaft 11 is rotated, the annulus 14 and its pole pieces rotate, causing the concentrated magnetic field regions to intersect conductors of the winding. Voltages indicated in FIG. 4 are induced at a given time when the pole piece **17*a* and other pole pieces are in the position represented in FIG. 4. Thus, the voltages induced in conductors on opposite sides of the armature disc are additive in series. The conductor pattern and the corresponding pattern for current flow through the winding will be partially traced with reference to FIG. 4. Current enters the winding at connection 23*a* to conductor 50, current flows along conductor 50 through aperture 51 to conductor 52 on the other side of the insulating sheet through aperture 53 along conductor 54, through aperture 55 along conductor 56 on the other side of the insulating sheet, through aperture 57 along conductor 58. Current continues around the winding in this manner through every conductor of the winding until it reaches the conductor connected to terminal 23**.

At a slightly later time, when the pole piece **17*a* has moved to a position corresponding to the position of conductor 58 represented in the drawing, the direction of current flow reverses. Accordingly, an alternating current is generated in the winding with 24 reversals or with a frequency corresponding to 12 cycles per revolution of shaft 11. Any speed variations in the rotation of the shaft 11** can be observed as variations of the frequency of the output signal. If more accurate measurement of transient speed variations is desired, the armature can be designed with a larger number of loop regions per magnet pole, in accordance with the relation previously explained. As explained previously, the magnetic field is concentrated into a region which intersects substantially only one loop of the conductors and substantially the entire annulus is utilized to generate the magnetic field. Moreover, adjacent regions of the magnetic field are of opposite polarity and additive signals are induced in the winding. Accordingly, the output signal generated is of maximum amplitude for a given rotational speed and given dimensions of the generator.

The invention is particularly advantageous in a machine utilizing a disc-type printed-circuit armature because of the large number of loop regions or armature poles which can be formed on the disc, rendering the machine capable of developing a high frequency of cycles per revolution. This makes the machine more effective as a speed measuring device. An alternating-current generator may also be constructed in accordance with the invention in a machine having a cylindrical winding.

While there has been described what is at present considered to be the preferred embodiment of this invention, it will be obvious to those skilled in the art that various changes and modifications may be made therein without departing from the invention, and it is, therefore, aimed to cover all such changes and modifications as fall within the true spirit and scope of the invention.

Having thus described my invention, what I claim and desire to protect by Letters Patent is:

1. An alternating-current generator comprising means having magnetic poles along its periphery for developing substantially discrete concentrated magnetic field regions of smaller peripheral dimension than corresponding peripheral regions of said field-developing means and with adjacent field regions being of opposite polarity; and a continuous winding having opposite faces and having a first set of conductors forming one face disposed in said magnetic field regions and having a second set of conductors forming the other face disposed in said magnetic field regions and having bridging connections connecting said conductors to form winding loop regions in at least one series circuit with successive conductors in said series circuit being in different sets and being spaced apart by more than one conductor spacing, said winding having output connections to predetermined conductors and having a number of loop regions which is an integral multiple of the number of poles of said field-developing means, said number of loop regions being selected in accordance with the equation $N=2n+4kn$, where the parameters are as defined in the specification, and providing at least two pairs of loop regions per magnetic field region, said field-developing means being effective to concentrate each magnetic field region substantially within one loop region, one of said field-developing means and said winding means being rotatable with respect to the other for developing an alternating-current output signal having a high frequency of electrical cycles per revolution of one of said field-developing means and said winding means.

2. An alternating-current generator comprising: means having a given periphery for developing substantial discrete concentrated magnetic field regions of smaller peripheral dimension than corresponding peripheral regions of said field-developing means and with adjacent field regions being of opposite polarity; and a continuous winding comprising an insulating sheet and individual printed-circuit conductors coated on both sides of said insulating sheet and disposed in said magnetic field regions and having output connections to predetermined conductors, said winding having bridging connections connecting said conductors to form winding loop regions in at least one series circuit with successive conductors in said series circuit being on different sides of said insulating sheet and being spaced by more than one conductor spacing, said winding having a number of loop regions which is an integral multiple of the number of said magnetic field regions and having at least two pairs of loop regions per magnetic field region, said field-developing means being effective to concentrate each magnetic field region substantially within one loop region, one of said field-developing means and said winding means being rotatable with respect to the other for developing an alternating-current output signal.

3. An alternating-current generator comprising: means having a given periphery for developing substantially discrete concentrated magnetic field regions of smaller peripheral dimension than corresponding peripheral regions of said field-developing means and with adjacent field regions being of opposite polarity; and continuous winding means having opposite faces and having a first set of conductors on one face disposed in said magnetic field regions and having a second set of conductors on the other face disposed in said magnetic field regions and having bridging connections connecting said conductors to form winding loop regions in at least one series circuit with successive conductors in said series circuit being in different sets and being spaced apart by more than one conductor spacing, said winding means having permanent output connections to predetermined conductors and having a number of loop regions which is an integral multiple of the number of said magnetic field regions with at least two pairs of loop regions per magnetic field region, said field-developing means being effective to concentrate each magnetic field region substantially within one loop region, said continuous winding means being stationary and said field-developing means being rotatable for developing an alternating-current output signal.

4. An alternating-current generator comprising: an annulus of magnetic material having magnetized pole regions with tapered pole pieces along its periphery for developing substantially discrete concentrated magnetic field regions with adjacent regions being of opposite polarity; and a continuous winding comprising an insulating sheet and individual printed-circuit conductors coated on both sides of said insulating sheet and disposed in said magnetic field regions and having permanent output connections to predetermined conductors, said winding having bridging connections connecting said conductors to form winding loop regions in at least one series circuit with successive conductors in said series circuit being on different sides of said insulating sheet and being spaced apart by more than one conductor spacing, said winding having a number of loop regions which is an integral multiple of the number of magnetized pole regions of said annulus, said number of loop regions being selected in accordance with the equation $N=2n+4kn$, where the parameters are as defined in the specification, and providing at least two pairs of loop regions per magnetic field region, said field-developing annulus and pole pieces being effective to concentrate each magnetic field region substantially within one loop region, said pole pieces being effective to concentrate said magnetic field regions to an angular extent not substantially greater than the angular extent of said loop regions, said winding being stationary and said annulus being rotatable for developing an alternating-current output signal having a high frequency of electrical cycles per revolution of said annulus.

References Cited by the Examiner

UNITED STATES PATENTS

| | | | |
|---|---|---|---|
| 447,921 | 3/1891 | Tesla | 310—168 |
| 2,970,238 | 1/1961 | Swiggett | 310—268 |
| 3,109,114 | 10/1963 | Baudot | 310—268 |

FOREIGN PATENTS

| | | |
|---|---|---|
| 217,875 | 3/1942 | Switzerland. |

OTHER REFERENCES

"Electrical Machine Design" (Gray), published by McGraw-Hill (New York), 1913 (pages 160–161 relied on, copy in Division 26).

MILTON O. HIRSHFIELD, *Primary Examiner.*

DAVID X. SLINEY, *Examiner.*